United States Patent
Kouadjo et al.

(10) Patent No.: US 8,200,219 B2
(45) Date of Patent: Jun. 12, 2012

(54) METHOD AND DEVICE FOR IDENTIFYING A MOBILE TERMINAL IN A DIGITAL CELLULAR MOBILE RADIO NETWORK

(75) Inventors: Larisse Nana Kouadjo, Pforzheim (DE); Georg Gunzelmann, Wiernsheim (DE)

(73) Assignee: Thales Defence Deutschland GmbH (DE)

( * ) Notice: Subject to any disclaimer, the term of this patent is extended or adjusted under 35 U.S.C. 154(b) by 1010 days.

(21) Appl. No.: 12/064,512

(22) PCT Filed: May 19, 2006

(86) PCT No.: PCT/EP2006/004747
§ 371 (c)(1),
(2), (4) Date: Feb. 22, 2008

(87) PCT Pub. No.: WO2007/022811
PCT Pub. Date: Mar. 1, 2007

(65) Prior Publication Data
US 2008/0220777 A1    Sep. 11, 2008

(30) Foreign Application Priority Data
Aug. 23, 2005   (DE) .......................... 10 2005 040 002

(51) Int. Cl.
*H04W 4/00* (2009.01)
(52) U.S. Cl. ..................... 455/435.1; 370/355; 370/328; 370/241; 370/244; 455/424; 455/423; 455/450; 455/411; 455/456.5
(58) Field of Classification Search .................. 370/355, 370/328, 241, 244, 224; 455/424, 423, 450, 455/411, 425, 456.5, 435.1; 701/3, 36, 2, 701/16
See application file for complete search history.

(56) References Cited

U.S. PATENT DOCUMENTS
5,875,397 A *  2/1999  Sasin et al. .................... 455/423
(Continued)

FOREIGN PATENT DOCUMENTS
CA           2 619 998 A1    3/2007
(Continued)

OTHER PUBLICATIONS
WO 2005011318 A1 translation.*
3GPP Organizational Partners, 3GPP TS 33.102 V6.3.0, Dec. 2004, Security Architecture (Release 6), http://www.3gpp.org,Valbonne, France.
(Continued)

*Primary Examiner* — Rafael Pérez-Gutiérrez
*Assistant Examiner* — Joseph Arévalo
(74) *Attorney, Agent, or Firm* — Donald R. Boys; Central Coast Patent Agency, Inc.

(57) ABSTRACT

The invention relates to a method and a simulator (1) for identifying and/or tapping a mobile terminal (7) in a digital cellular mobile radio network, in which data is transmitted according to a code multiplex method. The aim of the invention is to enable a terminal (7) to be identified in a mobile radio network, in which data is transmitted according to a code multiplex method and if required to enable the tapping of conversations that are conducted via the mobile telephone. To achieve this: a simulator (1) is positioned in close proximity to the terminal (7) to be identified; the parameters that are relevant to the data transmission of base stations (6) in the mobile radio network that are in close proximity to the simulator (1) are determined by a measuring system (3; 11) and are transferred to the simulator (1); the simulator (1) is operated as a new base station (2), taking into consideration the determined parameters, but having another location area code; the terminal to be identified (7) recognizes the simulator (1) as a new base station (2) and logs on to said station using its identification parameters; the terminal (7) is identified by means of the transmitted identification parameters; after identification, the terminal (7) is redirected to a GSM mobile radio network.

13 Claims, 3 Drawing Sheets

U.S. PATENT DOCUMENTS

Figure 1:
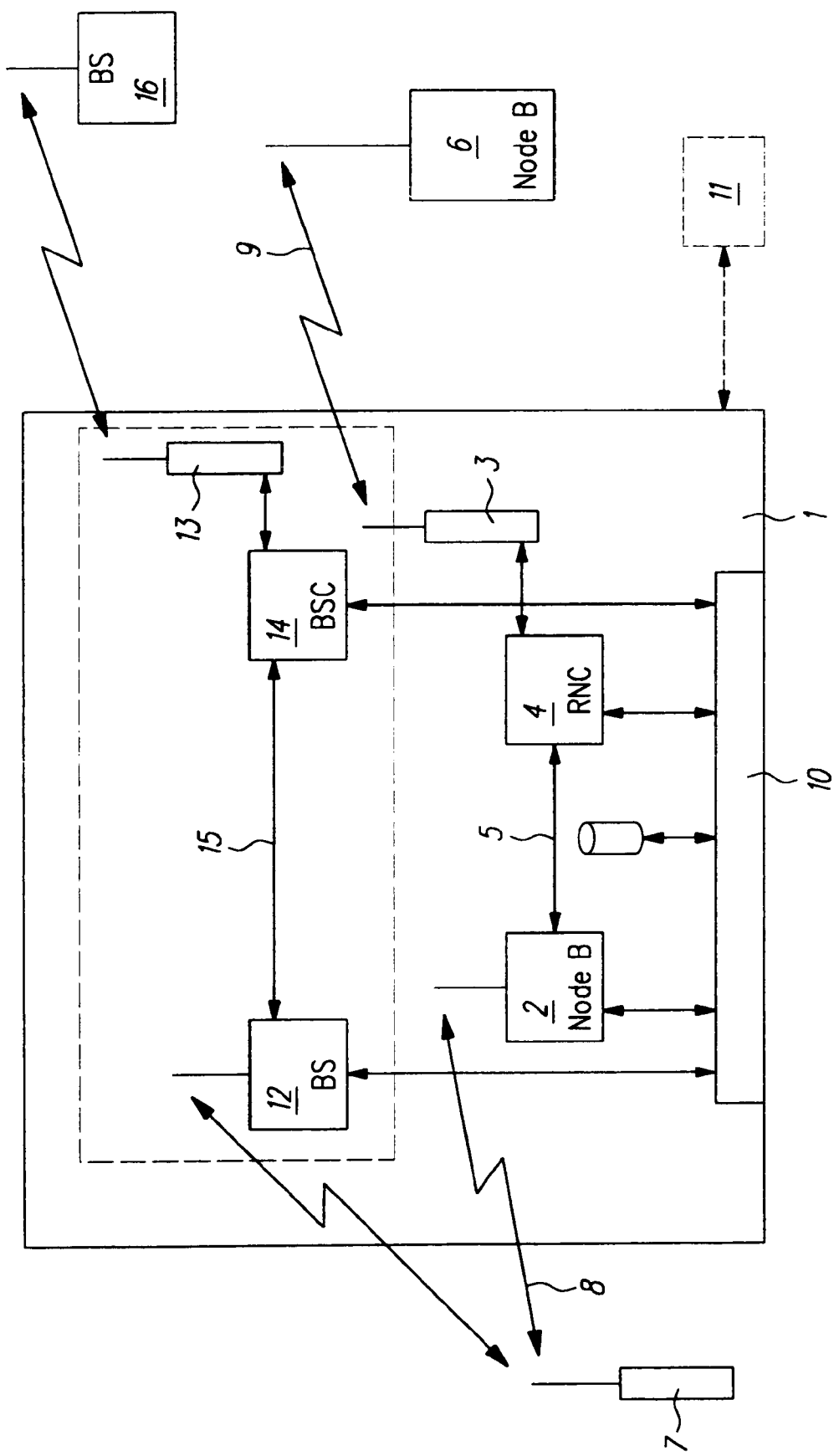

| | | | |
|---|---|---|---|
| 6,272,450 B1 * | 8/2001 | Hill et al. | 703/13 |
| 2003/0069010 A1 * | 4/2003 | Eravelli | 455/423 |
| 2006/0121916 A1 * | 6/2006 | Aborn et al. | 455/456.5 |
| 2006/0291455 A1 * | 12/2006 | Katz et al. | 370/355 |
| 2008/0311901 A1 * | 12/2008 | Bizzarri et al. | 455/424 |
| 2009/0131063 A1 * | 5/2009 | Yi et al. | 455/450 |

FOREIGN PATENT DOCUMENTS

| | | |
|---|---|---|
| DE | 19749388 A1 | 5/1999 |
| DE | 19749388 C2 | 5/1999 |
| DE | 199 20 222 A1 | 11/2000 |
| DE | 19920222 A1 | 11/2000 |
| EP | 0827356 A2 | 3/1998 |
| WO | 0160098 A1 | 8/2001 |
| WO | 2004082315 A1 | 9/2004 |
| WO | 2005011317 A1 | 2/2005 |
| WO | 2005011318 A1 | 2/2005 |

OTHER PUBLICATIONS

3GPP Organizational Partners, 3GPP TS 33.108 V6.8.2, Jan. 2005, Handover Interface for Lawful Interception (Release 6), http://www.3gpp.org,Valbonne, France.

Federath, Hannes, Protection in Mobile Communications, Dresden University of Technology, Department of Computer Science, 1999, Dresden, Germany.

Fox, Dirk, Der IMSI-Catcher, Schwerpunkt, 2004.

Fox, Dirk, Compass Security Event, Apr. 4, 2004.

Meyer, Ulrike, On the Impact of GSM Encryption and Man-In-The-Middle Attacks on the Security of Interoperating GSM-UMTS Networks, Sep. 2004.

Meyer, Ulrike, A Man-in-the-Middle on UMTS, Oct. 1, 2004, Philadelphia Pennsylvania USA.

* cited by examiner

METHOD AND DEVICE FOR IDENTIFYING A MOBILE TERMINAL IN A DIGITAL CELLULAR MOBILE RADIO NETWORK

CROSS-REFERENCE TO RELATED DOCUMENTS

The present application claims priority to a German patent application serial numbers DE 10 2005 040 002.7, filed on Aug. 23, 2005, which is incorporated herein in its entirety, at least by reference.

DESCRIPTION

The present invention describes a process for the identification of a mobile user end device in a digital cellular mobile radio network through which data are transmitted according to a CDMA (Code Divisional Multiple Access) process. In addition, the invention describes a simulator for the identification of a mobile end device in a digitally cellular mobile radio network through which data are transmitted in a CDMA (Code Divisional Multiple Access) process.

Security forces have among other matters the assignment to solve crimes that have already taken place and/or to prevent crimes from occurring. An important factor in fulfillment of these assignments is the ability in specific situations to identify a suspect on the basis of mobile telephone use and to listen in on, record, and evaluate conversations that the person holds over the mobile telephone. The security forces are empowered to do this through relevant legal ordinances and regulations. The goal is to gather the communication traces of a suspect in order to identify the person and/or the mobile telephone that was used and to record and evaluate the conversations that were held.

In the state of the art various mobile radio networks for the transmittal of data are known. Very widespread in use, both in terms of network coverage as also in terms of the number of mobile user end devices, are GSM (Global System for Mobile Communications) mobile radio networks. For the past few years UMTS (Universal Mobile Telecommunications System) mobile radio networks have been available and are becoming increasingly widespread. These two standards differ from each other for example in authentication, protection of integrity, and encrypting. While in GSM only the mobile user end device is required to authenticate itself over a base station, UMTS also requires that the base station authenticate itself with the mobile user end device. In the context of the protection of integrity in UMTS, the directing data that need to be transmitted over the mobile radio network are for example protected by signatures against tampering. In order to encrypt the data that are to be carried over the mobile radio network, special encrypting processes are implemented for UMTS, such as for example the Kazumi process. The UMTS encryption relates both to the user data as well as the direction data. While a GSM mobile radio network implements a combination of frequency multiplex processes (FDMA—Frequency Divisional Multiple Access) and time multiplex processes (TDMA—Time Divisional Multiple Access) for the transmittal of data, a UMTS mobile radio network utilizes a code multiplex process (CDMA—Code Divisional Multiple Access) in which the data (signals) are transmitted to several sources or senders at the same time. In this case the data are assigned specific code patterns (so called Scrambling Code).

In addition there is for example a process, that is known according to DE 199 20 222 A1, for identification and listening in on a mobile user end device in a digital cellular GSM mobile radio network. On the basis of the above noted examples and not complete listing of differences between a GSM mobile radio network and a mobile radio network, in which the data are transmitted according to the code multiplex process, as for example in a UMTS mobile radio network, the processes known for GSM networks cannot be easily transferred to UMTS networks.

Very generally the UMTS handover intersection point is described in the technical specification ETSI 3GPP TS 33 108 Version 6.8.2 Release 6 of January 2005 under the so-called "lawful interception". The "lawful interception" is the term of art for a performance characteristic which all technical installations of public communication networks must offer. The "lawful interception" concerns the possibility of authorized governmental offices being able to optionally switch into particular communication connections and to listen to the communication traffic that is passing through there. Thus, for example, mobile radio network agencies must possess sufficient equipment to be able to do this. The technical requirements are of course described in the Technical Specification that must be fulfilled by UMTS Handover intersection points in order to make the "lawful interception" possible. If the requirements that are described there are not met by a UMTS mobile radio network, the identification of or interception of mobile user end devices would be impossible from the outset due to lacking technical requirements.

WO 2005/011 318 A1 describes how, a simulator that is installed into a GSM radio cell for the purpose of intercepting a mobile user end device, which simulator operates as a virtual base station, can only accept the registration of the to be listened to user end device and rejects the registration of other devices. The purpose of this invention to reduce the load of virtual base stations by other user end devices during the interception of the to be listened to user end device. For this reason the virtual base station is able to send rejection signals to user end devices that attempt to register themselves with the virtual base station.

The purpose of the present invention is to create an opportunity for identifying a mobile telephone in a mobile radio network through which data are transmitted according to a code multiplex process, especially in a UMTS mobile radio network, and—where desired—to also listen to conversations being held on the mobile telephone.

For the solution of this task, it is suggested that at the end of the process of the type mentioned initially a simulator be arranged in spatial proximity to the to be identified user end device;

from a measurement system which determines the relevant parameters for the transfer of data from base stations of the mobile radio network in close proximity to the simulator and hands them over to the simulator;

the simulator subject to the determined parameters be operated as a new base station;

the to be identified user end device be recognized as a new base station and register itself there with its identification parameters;

the user end device be identified on the basis of the transmitted identification parameters; and the user end device be rejected from the GSM (Global System for Mobile Communication) mobile radio network after the identification.

Processes based on the invention are suggested through which relevant mobile radio network base station parameters for data transmission can be determined in spatial proximity to the simulator and can be utilized for the identification of the user end device. The simulator is thus arranged in spatial proximity to the to be identified user end device; that is, in the radio cell in which the user end device is registered. The located parameters include in particular the scrambling codes and/or the transmission strengths of the base stations that are used by the base stations that are arranged in proximity to the simulator. The scrambling code is a code pattern, with which the various transmitters are coded within the frame of a code multiplex process for the transmission of data. At that point the simulator is operated as a new base station however with a different Location Area Code than the original base station in which the identified user end device was originally registered. For this purpose, the simulator has access to necessary means, for example a base station which enables the operation of a simulator as a base station in a mobile radio network.

In addition the simulator sends system information in fact within the same frequency band as the original base station, though at a higher transmission power than the original base station. The emission of another Location Area Code (LAC) simulates to the to be identified user end device a movement of the user end device in a new spatial area to which the other LAC is assigned. By this means the user end device is compelled to make an automatic registration with the simulator. For this purpose the user end device performs a so called Location Update.

On the basis of the identification parameters, the identification of the user end device can take place. The identification parameters include for example an IMSI (International Mobile Subscriber Identity), a TMSI (Temporary Mobile Subscriber Identity), P-TMSI (Packet TMSI) and/or an IMEI (International Mobile Equipment Identity). These identification parameters are sufficient to adequately develop a connection between the simulator and the to be identified user end device for the purpose of listening to the conversation being held over the user end device. For this purpose the simulator has available sufficient means, for example a user end device which permits the operation of the simulator as a user end device for the development of a connection to the to be identified user end device and for monitoring the connection and/or the conversation.

According to a preferred method of the invention, the measurement system is designed as a monitor-user end device which can be a part of the simulator. Because user end devices transmit regardless of the relevant parameters of base stations in the mobile radio network in close proximity to the user end device needed for data transmissions, measurement systems based on the ideas of the invention can be employed.

The actual name and the personal data of the user of the user end device are registered with the operator (known as a provider) of the mobile radio network and can be requested from it in the context of an official inquiry. Only the provider has access to cross-reference lists that enable the attribution of the IMSI to a user and/or of the IMSI to a call number. The TMSI is—as the name itself points out—only of a temporary nature and does not permit a clear attribution to a particular user or to a particular call number. For this reason, it is important that not only the TMSI but also the IMSI be available.

If the to be identified user end device transmits, at identification to the simulator, only the TMSI (Temporary Mobile Subscriber Identity) as the identification parameter, then the authentication procedure can begin. If the to be identified user end device however expects an authentication procedure, then it is proposed according to the further advantageous embodiment of the invention that after the registration of the user end device with the simulator an authentication procedure is commenced;
the to be identified user end device rejects the authentication procedure as erroneous;
the simulator again begins an identification procedure in the course of which the simulator asks the to be identified user end device for its IMSI (International Mobile Subscriber Identity) or IMEI (International Mobile Equipment Identity); and
the simulator receives the IMSI or the IMEI of the to be identified user end device.

According to this further embodiment initially an authentication procedure is started. However because the simulator, and/or the new base station, cannot identify themselves as being part of the simulator (which is required however in UMTS networks), the to be identified user end device rejects the authentication procedure as erroneous, for example on the basis of a MAC error. Thus the simulator begins the identification procedure, through which the to be identified end device simulates an impression that the new base station (which is in fact a part of the simulator itself) requires, for identification purposes, the identification parameters (IMSI or IMEI) of the to be identified user end device. Thereafter the user end device transmits its IMSI or IMEI to the simulator on the basis of which a clear identification of the user end device is possible.

According to a preferred embodiment of the invention, it is proposed that the attempt to register with the simulator by the user end device to be identified, after the user end device has recognized the simulator as a new base station, be rejected or the connection between the user end device and the new base station be interrupted and/or disrupted by some other means; and
on the basis of a protocol to be used in the mobile radio network for the transmission of data the user end device be compelled to automatically register at another base station of another radio cell of another mobile radio network for the transmission of data according to another protocol.

As an advantage the to be identified user end device is forced upon rejection of the registration attempt into the mobile radio network to automatically register with a base station of a GSM (Global System for Mobile Communication) radio cell. Primarily the telephone conversations held over the identified user end device and the GSM radio cell are listened to with the aid of common listening methods for GSM mobile radio networks.

Upon successful identification of the user end device, the user end device is thus pointed to a conventional GSM mobile radio network. This can take place for example through defined information elements (IE), through interference (so called jamming) of the UMTS connection, or through other suitable means.

Upon a disruption or interference of the UMTS connection, the user end device is directed to create a connection over an alternative mobile radio network, particularly over the GSM network, on the basis of the protocol used for the data transmission in the mobile radio network. This takes place for example in the context of a so called "Cell Reselection" procedure.

Following the development of the connection to the GSM network, the entire conversation process in the user end device proceeds in the usual manner according to the GSM standard. In order to listen to the conversations, usual processes can be applied such as for example those that are known from DE 199 20 222 A1. Reference is specifically made to this document in regard to the known methods for listening into a user end device in a GSM network. In this respect the content of this document is incorporated herein by reference.

According to another advantageous embodiment of the present invention it is proposed that following the identification of the user end device

- by means of a monitor user end device the determined identification parameters and the security capabilities of the identified user end device be transmitted to a real base station of the mobile radio network;
- the real base station sends back RAND (random number) and AUTN (authentication token) to the monitor user end device;
- the simulator interrupts the connection to the real base station of the mobile radio network;
- the simulator is operated as an other base station of an other radio cell of a GSM mobile radio network and builds a connection to the identified device;
- an authentication procedure is initiated between the identified user end device and the simulator; and
- where the authentication procedure is successfully terminated, the simulator causes the identified user end device not to use encryption in the subsequent data transmission.

The simulator establishes upon interruption of the connection to the real base station of the mobile radio network another connection to the identified user end device over a base station of a GSM (Global System for Mobile Communication) radio cell.

The monitor user end device is a preferred part of the simulator. The RAND and AUTN number sets that the simulator obtains from a real base station of the mobile radio network involve parameters that are required in UMTS for the authentication of a base station in relation to a user end device. The monitor user end device simulates a real base station, in other words a desired connection, and causes the real base station to thus transmit RAND and AUTN to the simulator. From the point of view of the real base station, the simulator is a real user end device. It is only possible with the assistance of the RAND and AUTN parameters to establish a conversation connection between a base station and an identified user end device that is to be listened to.

The establishment of a connection to the user end device that is to be listened to proceeds on the basis of a simulated GSM base station of a GSM radio cell of a GSM mobile radio network. The simulated GSM base station is preferably part of the simulator. Following successful authentication, the simulated GSM base station sends security parameters to the user end device that is to be listened to. The security parameters encompass, among other things, a command to the user end device, to operate without encryption (the so-called "No Encryption" parameter); that is, to transmit non-encrypted data.

The proposed concept according to this embodiment works with two different mobile radio networks, namely the UMTS and the GSM networks. For this reason, the to be listened to user end device must be a Multi-Radio-Mode user end device which supports several differing mobile radio networks, namely UMTS and GSM networks. The concept encompasses a simulated GSM base station, a simulated UMTS base station, and a monitor user end device. The delay periods between the access to the authentication parameters and the suppression of the encryption should be as short as possible in order to prevent the real UMTS network from sending new RAND and AUTN prior to the encryption suppression. The delay periods should be in the realm of a few seconds, maximally within a minute.

As a further solution to the problem of the present invention, beginning with a simulator for the identification of a mobile user end device in a digital cellular mobile radio network of the type described at the beginning herein, is a simulator characterized by

- a measurement system for obtaining, from base stations located in the spatial proximity, parameters relevant for the transfer of data to the simulator;
- means of operating the simulator as a new base station while taking into consideration the obtained parameters, however with a different Location Area Code (LAC);
- means for receiving identification parameters of the to be identified user end device during registration of the user end device with the simulator; and
- means for identifying the user end device on the basis of transmitted identification parameters.

As a preferred method the measurement system is designed as a monitor user end device.

According to a preferred embodiment of the present invention it is proposed that the simulator feature means for the execution of the processes according to the invention.

Figure 2:
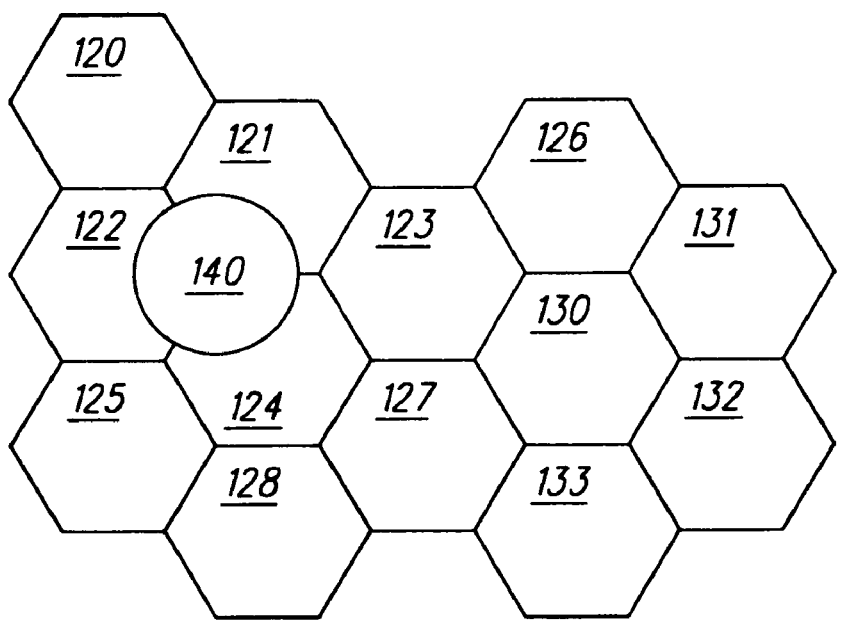
Figure 3:
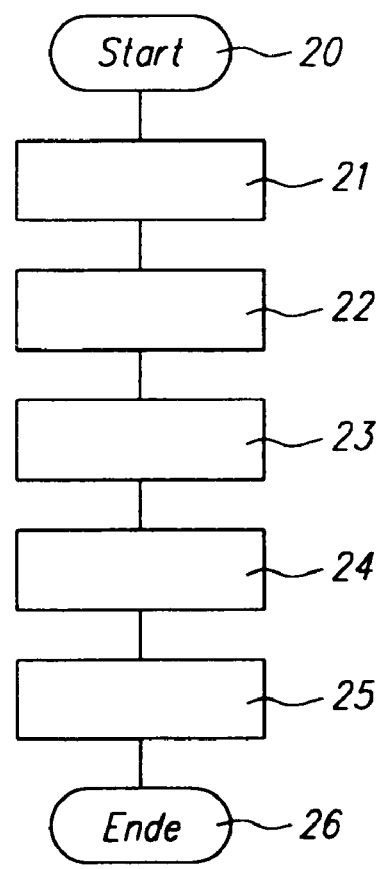
Figure 4:
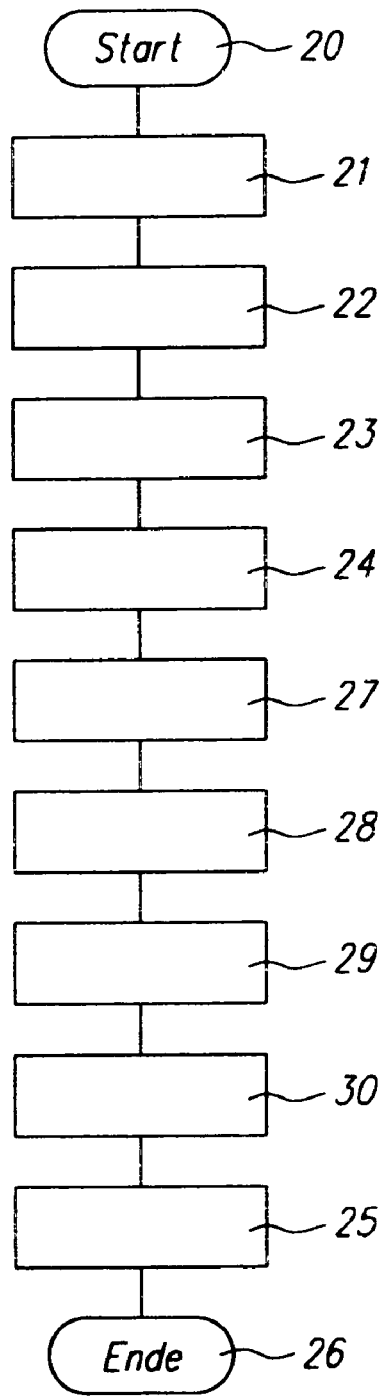
Figure 5:
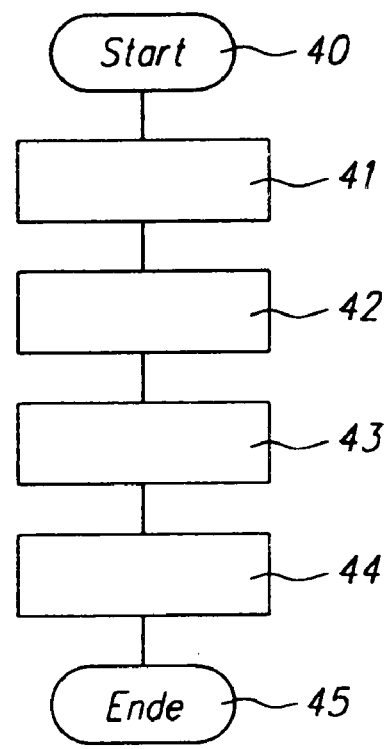

A preferred design example for the invention is more closely shown in the following discussion with reference to the figures. They show:

FIG. 1 a simulator according to the invention for the identification of a mobile user end device in a digital cellular mobile radio network according to a preferred design form;

FIG. 2 a depiction of a UMTS radio cell with differing Location Area Codes;

FIG. 3 a flow chart of a process according to the invention for the identification of a user end device according to a primary design form;

FIG. 4 a flow chart of a process according to the invention for the identification of a user end device according to a second design form; and FIG. 5 a flow chart of a process according to the invention for listening to a user end device according to the preferred design form.

Security forces have, among other matters, the assignment to solve crimes that have already taken place and/or to prevent crimes from occurring. An important aspect in fulfilling these assignments is the ability in specific well grounded situations to identify a suspect on the basis of mobile telephone use and to listen in on, record, and evaluate conversations that the person holds over the mobile telephone.

There are various mobile radio networks for the transmission of data. Very widely used in terms of network coverage as well as in terms of the number of mobile user end devices in use are GSM (Global System for Mobile Communications)—mobile radio networks. For the past several years UMTS (Universal Mobile Telecommunications System) mobile radio networks have become more available and increasingly used. Both standards differ for example in authentication, integrity protection, and encryption. A further difference is that in UMTS a so-called Code Division Multiple Access (CDMA) process is employed while in GSM a combination of Frequency Division Multiple Access and Time Division Multiple Access (FDMA/TDMA) processes are relied upon. On the basis of these significant differences, the processes and devices used for the identification and listening to a mobile user end device cannot be carried over to UMTS networks.

The present invention proposes for the first time a process through which at site identification and listening of user end devices belonging to suspects is possible even in UMTS mobile radio networks.

A device is shown in FIG. 1 for executing the process according to the invention. The device appropriate to the invention is a so called UTRAN (UMTS Terrestrial Radio Access Network) simulator. The simulator 1 includes a simulated UMTS base station 2, which is designated as NodeB, and a simulated monitor user end device 3, which works according to the UMTS standard and is designated as Monitor UE (User Equipment). In addition the simulator 1 includes an RNC (Radio Network Controller) functionality 4. Between the simulated NodeB 2 and the RNC-functionality 4, a so called lub intersection 5 is provided. In addition, a directing and service calculator 10 is provided which directs the steps of the process according to the invention.

In addition, the simulator 1 includes a simulated GSM base station 12 which is designated as a base station (BS) and a simulated GSM end station 13, which works according to the GMS standard. The simulated UMTS user end device 3 and the simulated GSM user end device 13 can be incorporated into a single unit. This is easily possible because the UMTS user end device normally include a GSM functionality in order to ensure a secure and reliable connection in areas with insufficient UMTS coverage. In any case the simulator 1 includes a BSC (Base Station Controller) functionality 14. Between the simulated BS 12 and the BSC functionality, an intersection 15 is provided.

In addition an external measurement system 11 is provided which measures the parameters relevant for UMTS of the base stations in the vicinity of simulator 1. Naturally the measurement system 11 can also be integrated into the simulator 1. A UMTS monitor user end device 3 is preferably used as the measurement system 11 so that no additional measurement systems are required. The measurement system 3 and/or 11 establish an overview of the cellular UMTS environment which is then transmitted to the UTRAN simulator 1.

The simulator 1 is engaged for the implementation of the process in a real UMTS environment which includes a real base station (NodeB) 6 and a real user end device (UE) 7. Naturally there can be more base stations in the UMTS environment than the illustrated base station 6 and more user end devices than the illustrated user end device 7. The user end device 7 is the to be identified and possibly to be listened to user end device and is designated as the Target-UE. An optional UMTS user end device becomes, according to the terminology used herein, a Target-UE 7 when it is registered (also partially) or has been booked in the UTRAN simulator 1. Between the real user end device 7 and the simulated NodeB 2, a Uu air intersection 8 is provided. Between the simulated end device 3 and the real NodeB 6 a further air intersection 9 is provided.

In FIG. 2 a cellular UMTS mobile radio network is represented that comprises many radio cells 120-128, 130-133. Some of the radio cells 120-128 belong to a first so called Location Area whereby all radio cells are attributed to the same Location Area Code (LAC) (for example LAC=1000). Other radio cells 130-133 belong to a second location Area whereby all radio cells 130-133 are attributed to the same Location Area Code (for example LAC=2000) which differs from the first Location Area Code. Base stations (NodeBs) cover one or more of the radio cells (120-128), 130-133. The base stations are however not shown in order to preserve the clear arrangement of FIG. 2.

FIG. 3 shows a flow chart of the process according to the invention for the identification of the end device 7. The process begins in a function block 20. The simulator 1 is attributed to the spatially near to the to be identified UMTS user end device 7 in a UMTS network (function block 21). The UTRAN simulator is operated in one of the geographic radio cells 120-128, 130-133 in which the base station is booked on the to be identified user end device 7. It is possible that the user end device 7 is booked together with other user end devices on the base station. With the measurement system 3, 11; the base stations surrounding the simulator 1 with parameters relevant to UMTS are measured in a function block 22 and/or captured by some other method and transmitted to the simulator 1. These parameters include for example so called Scrambling Codes of the radio cells 120-128, 130-133, the transmission power of the base stations, the identification parameters of NodeBs, and systems information.

In a function block 23, the UTRAN simulator 1 sends on its part system information in the same frequency band as the neighboring base stations but with higher transmission power so that the user end devices located spatially near to the simulator 1 (and thereby also the to be identified user end device 7) are recognized by the simulator 1 as new (simulated) base stations. Furthermore the simulator 1 transmits with a different Location Area Code (for example LAC=3000) so that the spatially near to the simulator 1 located user end devices (and thereby also the to be identified user end device 7) obtain the impression that they have moved spatially into a new area with a new LAC. The LAC of the simulated base station 2 is selected in such a manner that it is not used by the regular base stations 6 in the vicinity of the simulator 1.

A so called location update procedure is initiated thereby in these user end devices (and thus also in the to be identified user end device 7) within the scope of which the user end devices register with their identification parameters at the simulated base station 2 (function block 24). The identification parameters include for example a IMSI (International Mobile Subscriber Identity), a TMSI (Temporary Mobile Subscriber Identity) and/or an IMEI (International Mobile Subscriber Identity). On the basis of these identification parameters the identification of the user end device 7 thus takes place in function block 25. The process for the identification of the user end device 7 ends in a function block 26. The simulated spatial region with a new LAC is shown in a FIG. 2 via reference indicator 140.

The actual name and the personal data of the user end device 7 user are registered with the operator (so called provider) of the mobile radio network and can be accessed there possibly in the scope of an official investigation or through other methods. Only the provider has at its disposal the so called Cross-Reference lists which enable the attribution of the IMSI to a user and/or of the IMSI to a call number. The TMSI is—as the name already indicates—only temporary in nature and permits thus no clear attribution of a specific user or a specific call number. For this reason it is important that the IMSI or the IMEI and not the TMSI be present.

In the event the to be identified user end device 7 is transmitted upon registration with simulator 1 in function block 24 only with the TMSI (Temporary Mobile Subscriber Identity) as an identification parameter and waits for an authentication procedure, the invention can be supplemented according to the process flow chart in FIG. 4 such that subsequent to the registration of the user end device 7 with the simulator 1 in a function block 27 the authentication procedure is started. However because the simulator 1 and or the simulated base station 2 cannot identify itself as part of the simulator 1 in relation to user end device 7 (which is actually not required in UMTS networks), the to be identified user end device 7 rejects in a function block 28 the authentication procedure for example on the basis of a MAC error. Thus the simulator 1 starts on its part in a function block 29 an identification procedure whereby the to be identified user end device received a simulated impression 7 that simulated base station 2 requires the IMSI of the to be identified user end device 7 for reasons of identification. Thereupon the user end device 7 transmits in a function block 30 its IMSI to the simulator 1 on the basis of which the clear identification of the user end device 7 is possible within the function block 25. The process ends in function block 26.

Subsequent to the identification of the target user end device 7 according to the processes in FIG. 3 and FIG. 4, conversations received on or sent from the user end device 7 can be listened to by various methods. According to a first embodiment the flow chart of which is illustrated in FIG. 5, the process to listen in on the user end device 7 begins in a function block 40. In a function block 41 the identification of the user end device 7 takes place. The block 41 thus includes all process steps 20 to 26 of FIGS. 3 and/or 20 to 30 of FIG. 4. Thereupon the Location Update procedures of the user end device 7 are rejected by the simulator 1 and/or the simulated base station 2 in a function block 42.

At this point the user end device 7 registers in a function block 43 according to a so called Cell Reselection procedure over the simulated GSM base station 12 in a GSM radio cell of a GSM network. UMTS user end devices must also be able according to their standard to be used in a GSM network. The rejection of a target user end device 7 by the UMTS network in the GSM network can take place by various methods. Thus the rejection can occur for example through a command (a predetermined information) which is transmitted over a so called BCCH (Broadcast Control Channel). Alternatively, the rejection can also take place through optional information which is transmitted over the so called FACH (Forward Access Channel) or the so called DCCH (Dedicated Control Channel). The UTRAN simulator that is located in the UMTS user end devices contain this command (this information) and book themselves into an existing GSM network. One can imagine that the connection to the UMTS network can be restricted by other means for example through disruption (so called jamming) and can in the end be terminated.

All conversations that are received or sent over the target user end device 7 are now no longer carried over the UMTS network but over the GSM network. More specifically the conversations are carried over the simulated GSM base station 12, the simulated GSM user end device 13, and further to a real GSM base station 16. In a function block 44 the conversations can be listened to over a target user end device 7 in the GSM environment as it has been disclosed for example in DE 199 20 222 A1. The process then ends in a function block 45.

Naturally it is also possible to listen in to the conversations held over the target user end device 7 but also to perform already the identification of the user end device 7 in the GSM environment with conventional means. Thus even before the Location Update procedure is ended, it is diverted from the UMTS network to the GSM network and its IMSI and IMEI identity parameters are captured there in the GSM environment by means of known processes. Furthermore at that point a further manipulation of the target user end device 7 is possible.

It is also possible according to the present invention to listen to conversations held over the target user end device 7 through a so called Quasi-Transparent process. For this it is required that the simulator 1 initially obtain security information from the real UMTS base station 6 and then build with this information a connection between a simulated GSM base station 12 and the user end device 7. In addition, with the aid of the identification parameters of the end user device 7 obtained prior thereto in the context of the identification, a connection needs to be built from the GSM user end device 13 to the real GSM base station 16. Conversations from or to the target user end device 7 are now no longer held directly to the real base station 6 and/or 16, but only indirectly over the UTRAN simulator 1. The listened to conversations can be recorded in full or in part in simulator 1 for example for later evaluation or evidentiary requirements. Furthermore the conversations are mandatorily directed over the GSM network and not over the UMTS network even if sufficient UMTS coverage exists.

The invention claimed is:

1. Process for the identification of a mobile user end device in a digital cellular mobile radio network, through which data are transmitted according to a first protocol, comprising the following steps executed within the range of the first protocol:
   a simulator is arranged in close proximity to the to be identified user end device;
   from a measurement system the relevant parameters for data transmissions are determined by mobile radio network base stations in close proximity to the simulator and transferred to the simulator;
   subject to the determined parameters, the simulator is operated as a new base station;
   the to be identified user end device recognizes the simulator as a new base station and registers itself there, at which point
   an authorization procedure is started in which the to be identified user end device rejects the authentication procedure as erroneous, the simulator starts the identification procedure during which the simulator requests the to be identified user end device for its identification parameters and the simulator receives the identification parameters of the to be identified user end device;
   the user end device is identified within the range of the first protocol on the basis of the transmitted identification parameter; and
   in the event that the registration attempt of the to be identified user end device is rejected at the simulator after the identification procedure or the connection between the user end device and the new base station is interrupted and/or disrupted by other means, the user end device is forced to automatically register with another base station of another radio cell of an alternative mobile radio network through which the data are transmitted according to a second protocol that deviates from the first protocol, transmitted within the range of the second protocol of the to be identified user end device in the context of a registration of its to be identified parameters, and the simulator receives the identification parameters of the user end device.

2. Process according to claim 1, characterized in that the user end device is rejected—after identification for the purpose of an interception, a determination of bearings, and/or a locating—to an alternative mobile radio network according to which the data are transmitted according to a second protocol that deviates from the first protocol.

3. Process according to claim 1, characterized in that in the mobile radio network a UMTS protocol is used as the first protocol.

4. Process according to claim 1, characterized in that in the alternative mobile radio network a GSM protocol is used as the second protocol.

5. Process according to claim 1, characterized in that the measurement system determines Scrambling Codes, operating frequencies, and/or transmission strengths used by the surrounding base stations to be the relevant parameters for data transmission.

6. Process according to claim 1, characterized in that the identified user end device transmits upon registration with the simulator and/or in the context of the identification procedure at least one of the following identification parameters to the simulator: IMSI, TMSI, P-TMSI and IMEI.

7. Process according to claim 6, characterized in that if the to be identified user end device transmits upon registration with the simulator solely the TMSI as the identification parameter,
an identification procedure is started and upon rejection by the to be identified user end device;
an authentication procedure is started;
the to be identified user end device rejects the authentication procedure as erroneous;
the simulator starts again an identification procedure during the course of which the simulator calls for the to be identified user end device calls for its IMSI and/or its IMEI; and
the simulator receives the IMSI and/or the IMEI of the to be identified user end device.

8. Process according to claim 1, characterized in that the simulator transmits in the same frequency band yet at a higher performance than the base stations surrounding simulator.

9. Process according to claim 1, characterized in that the simulator is operated in the same or in a spatially proximate located geographical radio cell, in the base station of which the to be identified user end device is registered.

10. Process according to claim 1, characterized in that the to be identified user end device is fooled by the presence of the simulator operating as the new base station, by a movement of the user end device in a new spatial field that is assigned another Location Area Code and, on the basis of the first protocol that is used in the mobile radio network for the transmission of data, and as a result of the first protocol that is used in the mobile radio network for the transmission of data, the user end device is forced to automatically register with the simulator.

11. Process according to claim 1, characterized in that
by means of a monitor user end device the determined identity parameters and the security capability of the identified user end device are transmitted to a real base station of the mobile radio network;
the real base station sends back to the monitor user end device a random number and an authentication token;
the simulator interrupts the connection to the real base station of the mobile radio network;
the simulator is operated as a different base station of another radio cell of a GSM-mobile radio network and builds a different connection to the identified user end device;
an authentication procedure is started between the identified user end device and the simulator; and
provided the authentication procedure ends successfully, the simulator causes the identified user end device not to use any encryption during the subsequent data transmission.

12. A simulator, arranged in spatial proximity to a to be identified mobile user end device, for the identification of a mobile user end device in a digital cellular mobile radio network, through which data are transmitted according to a first protocol, comprising:
a measurement system for the determination of the relevant parameters for the data transmission from base stations of the mobile radio network in spatial proximity to the simulator;
means for operating the simulator as a new base station in the mobile radio network subject to the determined parameters;
means for receiving identification parameters of the to be identified user end device during the registration of the user end device with the simulator, whereby
an authentication procedure is started, the to be identified user end device rejects the authentication procedure as erroneous, the simulator starts an identification procedure during which the simulator calls the to be identified user end device for its identification parameters and the simulator receives the identification parameters of the to be identified user end device;
means for the identification of the user end device within the field of the first protocol on the basis of transmitted identification parameters; and
means to reject the registration attempt of the to be identified user end device with the simulator after the identification procedure or to interrupt and/or disrupt the connection between the user end device and the new base station in a different manner, whereby the user end device is accordingly forced to transmit for an automatic registration at another base station of another radio cell of an alternative mobile radio network in which data are transmitted according to a second protocol that deviates from the first protocol, the to be identified user end device transmits its identification parameters within the field of the second protocol in the context of the registration and the simulator possesses means for receiving the identification parameters of the to be identified user end device.

13. Simulator according to claim 12, characterized in that the simulator possesses means to execute a process.

* * * * *